(12) United States Patent
Winterbach et al.

(10) Patent No.: US 12,451,258 B2
(45) Date of Patent: Oct. 21, 2025

(54) MOVEMENT FEEDBACK FOR ORTHOPEDIC PATIENT

(71) Applicant: Zimmer US, Inc., Warsaw, IN (US)

(72) Inventors: Dalton Winterbach, Grand Rapids, MI (US); Matt Vanderpool, Warsaw, IN (US); Kelli Palm, Grand Rapids, MI (US); Jenny Wang, Lake Oswego, OR (US); John Kotwick, Grand Rapids, MI (US); Vinay Tikka, Winona Lake, IN (US); Ted Spooner, Grand Rapids, MI (US); Dugal James, Bendigo (AU)

(73) Assignee: Zimmer US, Inc., Warsaw, IN (US)

( * ) Notice: Subject to any disclaimer, the term of this patent is extended or adjusted under 35 U.S.C. 154(b) by 0 days.

(21) Appl. No.: 18/603,842

(22) Filed: Mar. 13, 2024

(65) Prior Publication Data
US 2024/0212866 A1    Jun. 27, 2024

Related U.S. Application Data

(62) Division of application No. 16/851,606, filed on Apr. 17, 2020, now abandoned.
(Continued)

(51) Int. Cl.
*G16H 50/70* (2018.01)
*A61B 5/00* (2006.01)
(Continued)

(52) U.S. Cl.
CPC ............. *G16H 50/70* (2018.01); *A61B 5/024* (2013.01); *A61B 5/112* (2013.01); *A61B 5/1121* (2013.01);
(Continued)

(58) Field of Classification Search
CPC ........ A61B 5/112; A61B 5/1127; G06V 40/25
See application file for complete search history.

(56) References Cited

U.S. PATENT DOCUMENTS

| 7,981,057 B2 | 7/2011 | Stewart |
| 9,693,284 B2 | 6/2017 | Abedi |

(Continued)

FOREIGN PATENT DOCUMENTS

| CN | 117916812 A | 4/2024 |
| JP | 2024526774 A | 7/2024 |

(Continued)

OTHER PUBLICATIONS

Ferrari, A., et al. "Gait analysis contribution to problems identification and surgical planning in CP patients: an agreement study." Eur J Phys Rehabil Med 51.1 (2015): 39-48. (Year: 2015).*

(Continued)

*Primary Examiner* — Raphael Schwartz
(74) *Attorney, Agent, or Firm* — SCHWEGMAN LUNDBERG & WOESSNER, P.A.

(57) ABSTRACT

Systems and methods may be used for presenting motion feedback for an orthopedic patient. In an example, images may be captured of a patient in motion attempting to perform a task, for example after completion of an orthopedic surgery on the patient. The images may be analyzed to generate a movement metric of the patient corresponding to the task. The movement metric may be compared to a baseline metric (e.g., an average metric or a previous patient metric) for the task. An indication of the comparison may be presented, for example including a qualitative result of the comparison.

18 Claims, 13 Drawing Sheets

Related U.S. Application Data

(60) Provisional application No. 62/966,438, filed on Jan. 27, 2020, provisional application No. 62/853,425, filed on May 28, 2019, provisional application No. 62/836,338, filed on Apr. 19, 2019.

(51) Int. Cl.
| | |
|---|---|
| *A61B 5/024* | (2006.01) |
| *A61B 5/11* | (2006.01) |
| *G06T 7/00* | (2017.01) |
| *G06T 7/246* | (2017.01) |
| *G06V 40/16* | (2022.01) |
| *G06V 40/20* | (2022.01) |
| *G16H 15/00* | (2018.01) |
| *G16H 20/30* | (2018.01) |
| *G16H 40/67* | (2018.01) |
| *G16H 50/20* | (2018.01) |
| *G16H 50/30* | (2018.01) |

(52) U.S. Cl.
CPC .......... *A61B 5/1124* (2013.01); *A61B 5/1127* (2013.01); *A61B 5/1128* (2013.01); *A61B 5/4824* (2013.01); *A61B 5/6822* (2013.01); *A61B 5/7405* (2013.01); *A61B 5/744* (2013.01); *A61B 5/7445* (2013.01); *A61B 5/7455* (2013.01); *A61B 5/746* (2013.01); *G06T 7/0014* (2013.01); *G06T 7/251* (2017.01); *G06V 40/174* (2022.01); *G06V 40/25* (2022.01); *G16H 15/00* (2018.01); *G16H 20/30* (2018.01); *G16H 40/67* (2018.01); *G16H 50/20* (2018.01); *G16H 50/30* (2018.01); *A61B 2562/0219* (2013.01); *G06T 2207/10016* (2013.01); *G06T 2207/30196* (2013.01); *G06T 2207/30204* (2013.01)

(56) References Cited

U.S. PATENT DOCUMENTS

| | | | |
|---|---|---|---|
| 9,782,122 B1 | 10/2017 | Pulliam et al. | |
| 9,795,299 B2 | 10/2017 | Russell | |
| 9,895,105 B2 | 2/2018 | Romem | |
| 9,936,877 B2 | 4/2018 | Kotz et al. | |
| 10,076,286 B1 | 9/2018 | Bajaj et al. | |
| 10,216,904 B2 | 2/2019 | Hughes et al. | |
| 10,535,244 B2 | 1/2020 | Treacy et al. | |
| 10,561,360 B2 | 2/2020 | Amiot et al. | |
| 10,912,480 B2 | 2/2021 | Sridhar et al. | |
| 2004/0021660 A1 | 2/2004 | Ng-Thow-Hing et al. | |
| 2007/0103471 A1 | 5/2007 | Yang et al. | |
| 2010/0049095 A1* | 2/2010 | Bunn ............... | G16H 40/60 600/595 |
| 2013/0095459 A1 | 4/2013 | Tran | |
| 2015/0320343 A1* | 11/2015 | Utsunomiya .......... | A61B 5/742 600/595 |
| 2015/0325270 A1* | 11/2015 | Utsunomiya .......... | G16H 30/20 386/230 |
| 2016/0151013 A1 | 6/2016 | Atallah et al. | |
| 2016/0227483 A1 | 8/2016 | Wang et al. | |
| 2016/0278868 A1 | 9/2016 | Berend et al. | |
| 2016/0302721 A1 | 10/2016 | Wiedenhoefer et al. | |
| 2017/0344919 A1 | 11/2017 | Chang et al. | |
| 2019/0272917 A1 | 9/2019 | Couture et al. | |
| 2019/0283247 A1 | 9/2019 | Chang et al. | |
| 2020/0335222 A1 | 10/2020 | Winterbach et al. | |
| 2020/0352441 A1 | 11/2020 | Soykan et al. | |
| 2020/0383112 A1 | 12/2020 | Soro et al. | |
| 2021/0065870 A1 | 3/2021 | Spooner et al. | |
| 2021/0282652 A1 | 9/2021 | Donnelly et al. | |
| 2022/0392082 A1 | 12/2022 | Vanderpool et al. | |
| 2023/0114876 A1 | 4/2023 | Brincat et al. | |
| 2024/0312630 A1 | 9/2024 | Van Andel et al. | |

FOREIGN PATENT DOCUMENTS

| | | |
|---|---|---|
| WO | WO-2020123935 A1 | 6/2020 |
| WO | WO-2020123954 A1 | 6/2020 |
| WO | WO-2020247890 A1 | 12/2020 |
| WO | WO-2023288060 A1 | 1/2023 |

OTHER PUBLICATIONS

Van Egmond, Nienke, et al. "Gait analysis before and after corrective osteotomy in patients with knee osteoarthritis and a valgus deformity." Knee surgery, sports traumatology, arthroscopy 25 (2017): 2904-2913. (Year: 2017).*
"U.S. Appl. No. 16/851,606, Advisory Action mailed Aug. 10, 2023", 4 pgs.
"U.S. Appl. No. 16/851,606, Final Office Action mailed Jun. 14, 2023", 15 pgs.
"U.S. Appl. No. 16/851,606, Final Office Action mailed Dec. 13, 2023", 15 pgs.
"U.S. Appl. No. 16/851,606, Non Final Office Action mailed Mar. 9, 2023", 12 pgs.
"U.S. Appl. No. 16/851,606, Non Final Office Action mailed Sep. 22, 2023", 13 pgs.
"U.S. Appl. No. 16/851,606, Response filed May 31, 2023 to Non Final Office Action mailed Mar. 9, 2023", 11 pgs.
"U.S. Appl. No. 16/851,606, Response filed Jul. 28, 2023 to Final Office Action mailed Jun. 14, 2023", 9 pgs.
"U.S. Appl. No. 16/851,606, Response filed Nov. 21, 2022 to Restriction Requirement mailed Sep. 27, 2022", 7 pgs.
"U.S. Appl. No. 16/851,606, Response filed Dec. 1, 2023 to Non Final Office Action mailed Sep. 22, 2023", 8 pgs.
"U.S. Appl. No. 16/851,606, Restriction Requirement mailed Sep. 27, 2022", 6 pgs.
"U.S. Appl. No. 16/851,606, Supplemental Amendment filed Jun. 6, 2023", 11 pgs.
"U.S. Appl. No. 18/576,700, Preliminary Amendment Filed Jan. 4, 2024", 8 pgs.
"European Application Serial No. 22185079.5, Extended European Search Report mailed Apr. 6, 2023", 13 pgs.
"European Application Serial No. 22185079.5, Response filed Nov. 10, 2023 to Extended European Search Report mailed Apr. 6, 2023", 20 pgs.
"International Application Serial No. PCT/US2022/037284, International Preliminary Report on Patentability mailed Jan. 25, 2024", 17 pgs.
"International Application Serial No. PCT/US2022/037284, International Search Report mailed Dec. 2, 2022", 8 pgs.
"International Application Serial No. PCT/US2022/037284, Invitation to Pay Additional Fees mailed Oct. 11, 2022", 17 pgs.
"International Application Serial No. PCT/US2022/037284, Written Opinion mailed Dec. 2, 2022", 15 pgs.
Andreu-Perez, Javier, et al., "From Wearable Sensors to Smart Implants-Toward Pervasive and Personalized Healthcare", IEEE Transactions On Biomedical Engineering, IEEE, USA, vol. 62, No. 12, (Dec. 1, 2015), 2750-2762.
Misic, D, et al., "Real-Time Monitoring of Bone Fracture Recovery by Using Aware, Sensing, Smart, and Active Orthopedic Devices", IEEE Internet of Things Journal, IEEE, USA, vol. 5, No. 6, (Dec. 1, 2018), 4466-4473.
"U.S. Appl. No. 17/830,043, Non Final Office Action mailed Sep. 30, 2024", 11 pgs.
"Australian Application Serial No. 2022311928, First Examination Report mailed Oct. 15, 2024", 4 pgs.
"European Application Serial No. 22754226.3, Response Filed Aug. 22, 2024 to Communication pursuant to Rules 161(1) and 162 EPC", 9 pgs.

* cited by examiner

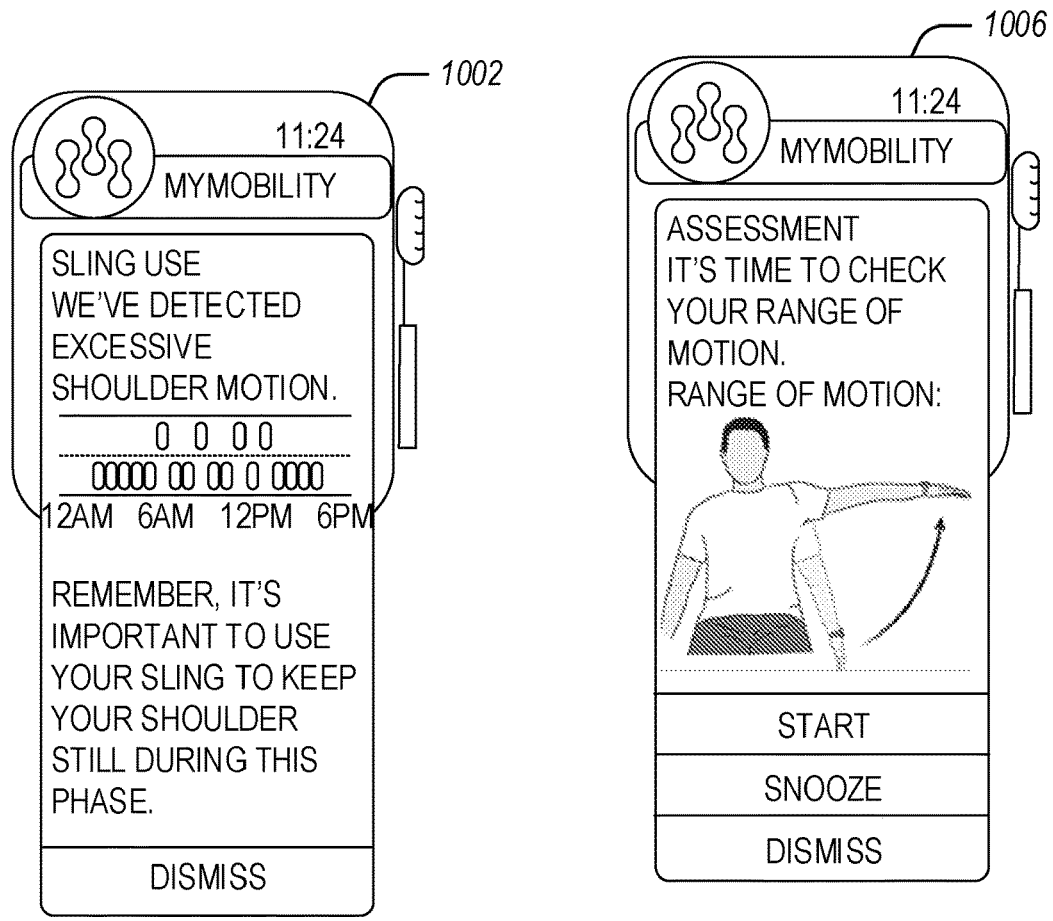
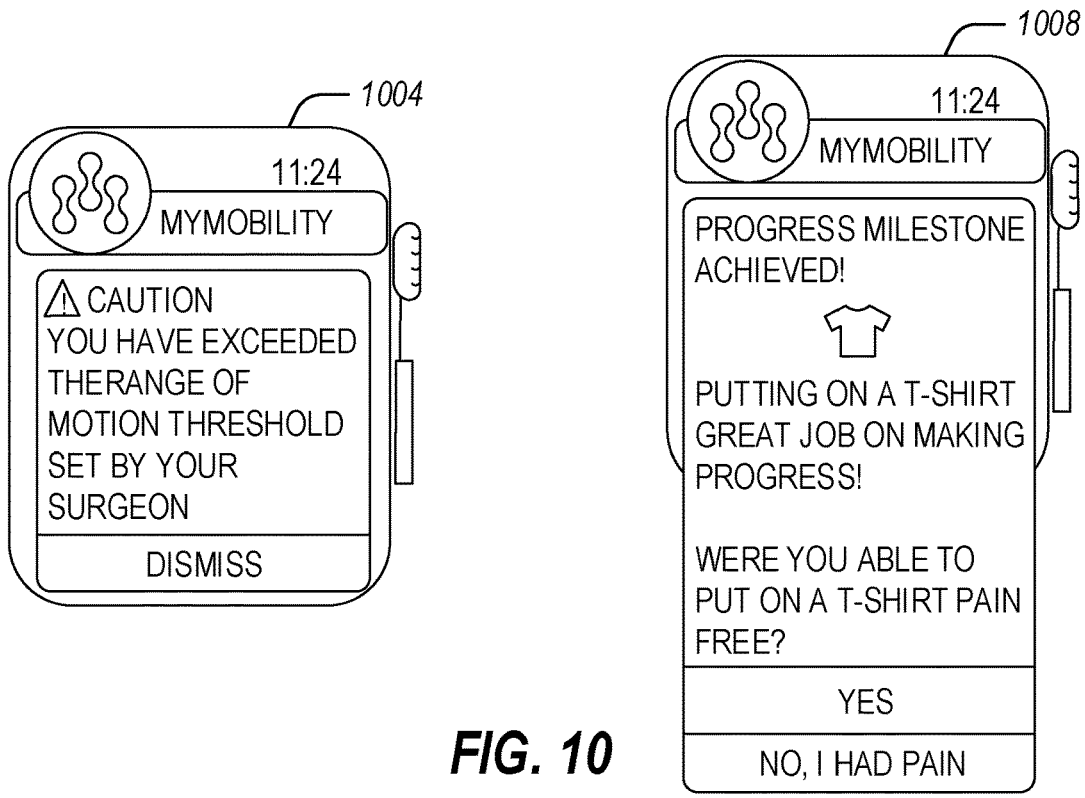
FIG. 10

MOVEMENT FEEDBACK FOR ORTHOPEDIC PATIENT

CLAIM OF PRIORITY

This application is a divisional of U.S. patent application Ser. No. 16/851,606, filed Apr. 17, 2020, which claims the benefit of priority to U.S. Provisional Applications Nos. 62/836,338, filed Apr. 19, 2019, titled "Mobile Application For Upper Extremity Patient Care"; 62/853,425, filed May 28, 2019, titled "Mobile Application For Upper Extremity Patient Care"; and 62/966,438, filed Jan. 27, 2020, titled "Mobile Application For Upper Extremity Patient Care", each of which is hereby incorporated herein by reference in its entirety.

BACKGROUND

Orthopedic patient care may require surgical intervention, such as for upper extremities (e.g., a shoulder or elbow), knee, hip, etc. For example when pain becomes unbearable for a patient, surgery may be recommended. Postoperative care may include immobility of a joint ranging from weeks to months, physical therapy, or occupational therapy. Immobilization within the upper extremity may lead to long term issues, such as "Frozen shoulder" where a shoulder capsule thickens and becomes stiff and tight. Physical therapy or occupational therapy may be used to help the patient with recovering strength, everyday functioning, and healing. Current techniques involving immobility, physical therapy, or occupational therapy may not monitor or adequately assess range of motion or for pain before or after surgical intervention.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 10 illustrates various example user interfaces for use with a user needing or wearing a sling in accordance with at least one example of this disclosure.

DETAILED DESCRIPTION

Systems and methods described herein may be used for presenting motion feedback for an orthopedic patient. In an example, images may be captured of a patient in motion attempting to perform a task, for example after completion of an orthopedic surgery on the patient. The images may be analyzed to generate a movement metric of the patient corresponding to the task. The movement metric may be compared to a baseline metric (e.g., an average metric or a previous patient metric) for the task. An indication of the comparison may be presented, for example including a qualitative result of the comparison.

Systems and methods described herein may be used to provide, assess, or augment orthopedic patient care (e.g., upper extremity, hip, knee, etc.). These systems and methods may include pain or range of motion assessment of an upper extremity, providing feedback or information to a patient regarding an upper extremity, or augmenting patient care with physical therapy, occupational therapy, warnings, or the like for an upper extremity.

Upper extremity procedures may include, measuring motion in more than just one plane—e.g., adduction, which may be unlike large joint (hip & knee arthroplasty). In an example, upper extremities may include elbow or shoulder. Elbow may be more of a trauma procedure and relatively rare compared to shoulder. Unlike large joint procedures, there may be an opportunity to monitor the patient and provide feedback prior to the decision on surgical intervention. There also may be a range of surgical interventions of varying invasiveness/significance leading up to total shoulder replacement.

Hip and knee replacements or orthopedic procedures may result in changes to gait, range of motion, or pain. Postoperative care may include physical or occupational therapy. The systems and methods described herein provide analysis of postoperative care of an orthopedic patient.

Figure 1:
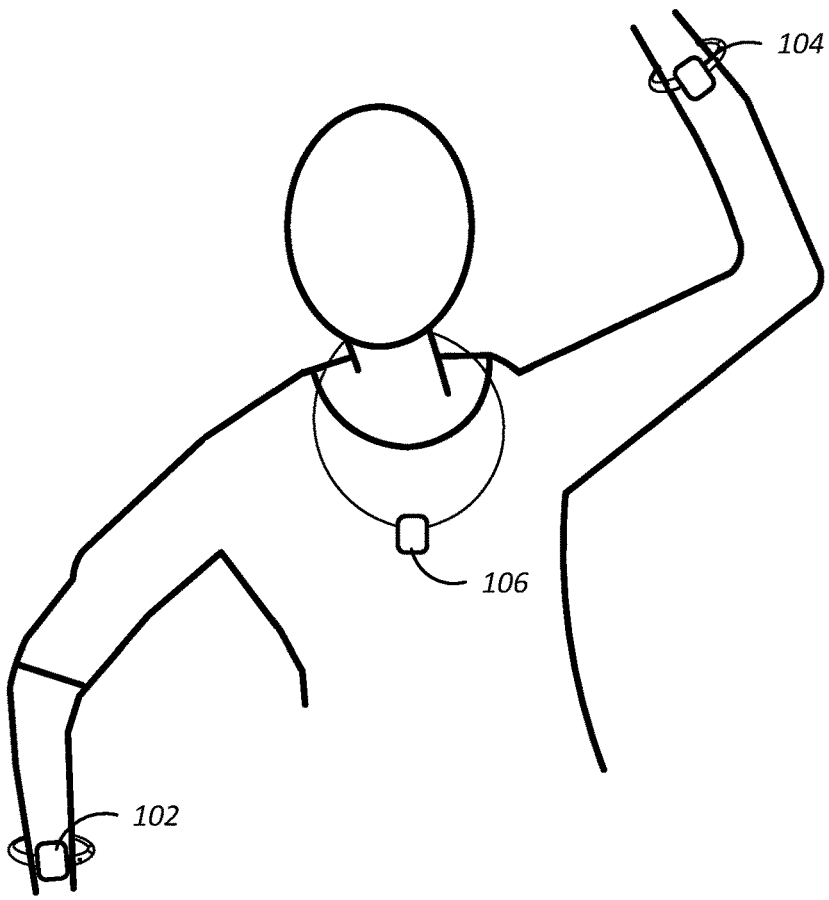
FIG. 1 illustrates an upper extremity monitoring system in accordance with at least one example of this disclosure.

FIG. 1 illustrates an upper extremity monitoring system 100 in accordance with at least one example of this disclosure.

The system 100 includes a first wrist-worn device 102 (e.g., a smart watch), and optionally includes a second wrist-worn device 104 or a neck-worn device 106.

One or more of the devices 102-106 may be used as a standalone device, or may work in communication with a mobile phone or with one or more of the other devices 102-106.

One or more of the devices 102-106 may be used to gathers data on steps, floors, gait, or the like. One or more of the devices 102-106 may be used to delivers notification to a user.

In an example, one or more of the devices 102-106 may be used to capture range of motion data or movement data, such as shoulder movement or range of motion data (e.g., adduction/abduction, flexion/extension, internal/external rotation), elbow movement or range of motion data (e.g., flexion/extension), wrist movement or range of motion data (e.g., pronation/supination), or the like.

Qualitative or quantitative data collection may be obtained. In an example for shoulder pain or a shoulder recommendation or procedure, raw range of motion (ROM) data may not be as valuable as describing the type of movement the patient is capable of or the pain in a patient. In an example, one or more of the devices 102-106 may be used to extrapolate elbow information, for example, when a second sensor or device is not used near the elbow. In another example, one or more of the devices 102-106 may be used near the elbow to detect elbow movement, pain, or range of motion data.

Having a picture or animation of the range of motion may be presented on one or more of the devices 102-106 or on a mobile phone. For example, an animation may be sent as a small file format to illustrate the motion on one or more of the devices 102-106. When a user clicks on a patient image, the user may be presented with the path of motion on one ne or more of the devices 102-106.

In an example, one or more of the devices 102-106 may include a bigger, more comfortable watch band than typical for wrist-worn watches.

Figure 2:
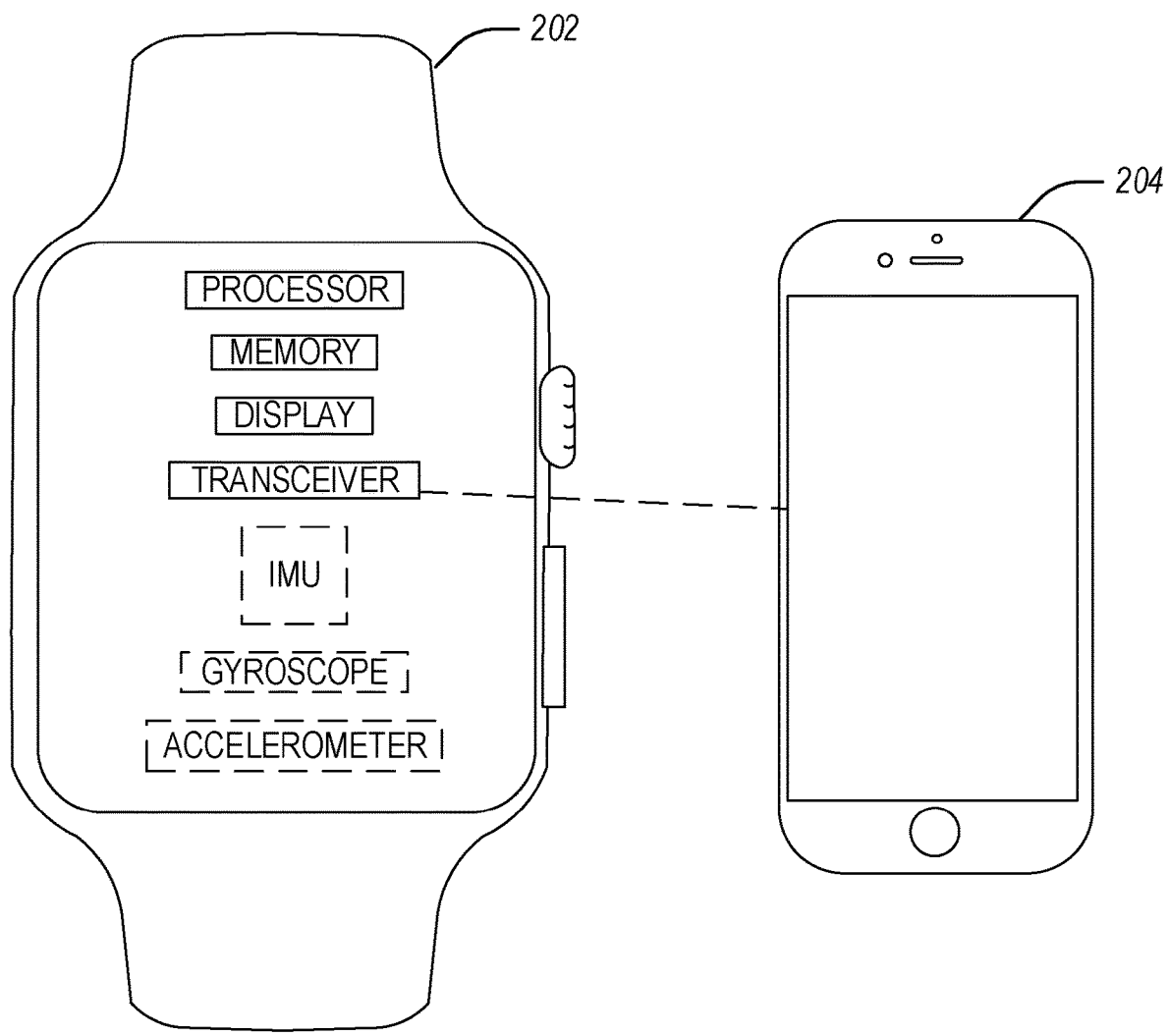
FIG. 2 illustrates a device for running a mobile application for upper extremity patient care in accordance with at least one example of this disclosure.

FIG. 2 illustrates a device 202 for running a mobile application for upper extremity patient care in accordance with at least one example of this disclosure. The device 202 may be in communication with a phone or other mobile device 204. The device 202 may be a smart device, such as a smart watch, or other device with a user interface.

In an example, the device 202 includes a processor, memory, a display (e.g., for displaying a user interface), a transceiver (e.g., for communicating with the mobile device 204), and optionally an inertial measurement unit (IMU), a gyroscope, or an accelerometer.

The device 202 may be used for advanced data collection. For example, the device 202 may be used to measure stress response (e.g., heart rate) for example, as a proxy for pain during arm motions. These heartrate spikes may be tied to an animation to visualize the pain on the model.

The device 202 may be used for "Sling management"—for example, by taking a picture of a sling worn by a patient. The device 202 may be used to analyze an angle of selfies taken using phone camera to obtain data regarding shoulder flexibility. The device 202 may be used to measure movement in sleep. The device 202 may be used for determining a maximum range of motion. For example, the device 202 may be used to capture max range of motion from day to day activities (e.g., rather than evaluation setting in a hospital/clinical setting).

When tracking steps, the device 202 may be used to look for max movement of the shoulder. The device 202 may be used to recognize rotation of the joint. The device prompts on the device 202 may be used to obtain a user's context—for example, is the user using a 1 lb weight, a 2 lb weight, etc. For a user carrying the mobile device 204 in a pocket, reliable mobile device 204 position may be used as another sensor, for example to track movements.

The device 202 may be used to derive data from combining the accelerometer with an altimeter—certain motions may only occur from certain positions. The device 202 may be used to compare movement information to a range of expectations—for example, the gyroscope on the device 202 may be used to compare the current data to a range of expectations.

The device 202 may be used to obtain a range of expectations from a non-operative arm—for example, baseline assessments on a good shoulder of a patient. The device 202 may be used to develop a baseline from data coming from healthy users. The device 202 may be used to collect data to improve implant products and techniques.

Advanced feedback may be generated, for example, by identifying potentially harmful movements—too active, movement is unclean, deviating from plane while exercising, exceeding recommended ROM, etc. The device 202 may provide haptic feedback or audio to alert the patient. The alert or feedback may include a warning, such as an indication that the user is sleeping on the wrong side. The device 202 may be used to provide an alarm and wake the patient up. The alert or feedback may include a warning for repetitive stress (e.g., a pitch count for an arm). The device 202 and the mobile device 204 may be used in combination to provide a target in augmented reality. The device 202 and the mobile device 204 may be used in combination, for example using a camera of the mobile device 204 to record at least one repetition of a movement (e.g., automatically captured when the user starts based on sensor data recorded by the device 202). The recording may be sent to a physical therapist or doctor to review.

Figure 3:
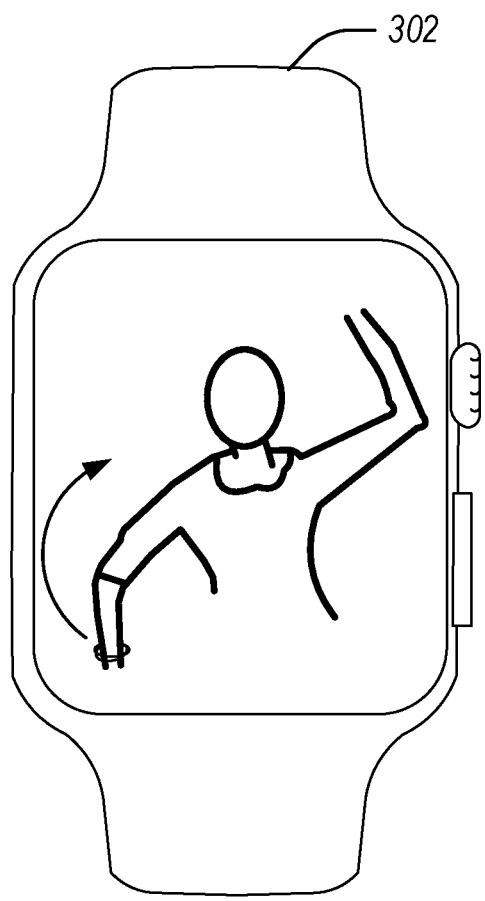
FIG. 3 illustrates a user interface for use with a mobile application for upper extremity patient care in accordance with at least one example of this disclosure.

FIG. 3 illustrates a user interface for use with a mobile application for upper extremity patient care in accordance with at least one example of this disclosure. The user interface may be displayed on a device 302, such as a smart watch.

The device 302 may show an animation, an image, a view of the user, or the like. For example, the device 302 may display a picture or animation of a range of motion. In an example, a user may select an image of a patient and the path of motion may be displayed in the device 302 in response.

The range of motion and fluidity of movement may be detected using the device 302. In an example, a model of dynamics of a user's body may be generated. For example, a skeletal model may be generated. The model dynamics may be improved by prompting the user with questions, such as "what activity did you just do", for example on the device 202 or a mobile phone. A model may be trained on this data. In an example, a machine learning model may be trained. The model may be used to automatically recognize patient activities (e.g., movements, pain, exercises, etc.), such as without requiring the patient to manually log the activity. In an example, daily living activities may be identified automatically. In an example, the dynamic model may include an avatar, an emoji (e.g., an Animoji—an animal emoji), or the like. In an example, activities may include Passive Range of Motion (PROM) actions: e.g., put on a coat, pull a coffee mug from the cupboard, etc.

The device 302 may be used for monitoring and alerting a user to awareness of the user's situation (e.g., movement, pain, range of motion, fluidity of movement, etc.), compared to other similarly situated users (e.g., by age, condition, etc.) or to an average user. The device 302 may be used to inform a user that the user is worse off than an average person with the user's demographics. The device 302 may monitor a patient that does not elect to have a procedure (e.g., surgery).

The device 302 may monitor sleep, because users may wait until they cannot sleep to decide to get a procedure. Lack of sleep may be used as a notification trigger, and a notification may be displayed on the device 302.

The device 302 may track motion of a user, and inform the user of results, such as "you are at 50% ability compared to an average person in your demographic." The device 302 may provide a list of activities the patient either cannot do or has not done. The device 302 may provide activity specific guidance, for example "we have data collected on tennis activity—[rehab or surgery] will allow you to play tennis better." The device 302 may provide a high-level assessment, for example "you would be a candidate for X surgery," "people of your profile got a surgical intervention," or the like.

The device 302 may provide objective data, for example that the patient is in excessive pain or has poor ROM, which may motivate the patient to seek a surgery election. The device 302 may provide a list of doctors.

In an example, the device 302 may provide a notification (e.g., related to lack of sleep, motion of a user, regarding objective data, or the like) to a user or a member of a care team that has the user as a patient (e.g., to a surgeon, a physical therapist, a nurse, etc.). The notification may be used by the member of the care team to prompt discussion with the patient regarding surgical intervention (e.g., a notification may include information indicating a surgical intervention is required or suggested). In an example, the notification to the member of the care team may include an assessment of the patient automatically or may be stored for future access by a member of the care team with proper access credentials. The notification may include results collected by the device 302.

In an example, the device 302 may provide telemedicine solutions. For example, a nurse practitioner may give virtual appointments through the device 302. The device 302 may link patients to a surgeon in their area. The device 302 may reduce surgeon communication burden, such as by providing proactive positive reinforcement that rehab is going well if that is what the data indicates. For example, "This is Dr. Wilson's office—everything looks to be going great."

Spouse/family members drive calls to the surgeon, so they may also be informed. For example, the device 302 may link to a personal assistance device (e.g., an Amazon Echo device from Amazon of Seattle, Washington or a Google Home device from Google of Mountain View, California) to provide an audible "good job" at home, perhaps from a recorded familiar voice (e.g., a nurse at the doctor's office). The device 302 may connect with another display device to provide efficient engagement, for example a hologram or recording of the doctor. In an example, the device 302 may route initial calls to a call center (e.g., instead of the doctor's office). The device 302 may play video messages to patient from surgeon that are keyed to customized thresholds for range of motion, for example "Range of motion looks good," "Range of motion needs work," or the like.

The device 302 may provide early infection detection. For example, the device 302 may communicate with a small patch that can detect temperature via embedded temperature sensor. A temperature change may be sign of infection, and may be sent to the device 302, which may alert the user or a doctor.

In an example, the device 302 may be used to monitor compliance with a prescribed prehab, rehab, or therapy program. A reward may be provided for compliance, for example a monetary reward from insurance company for compliance with rehab program.

Figure 4:
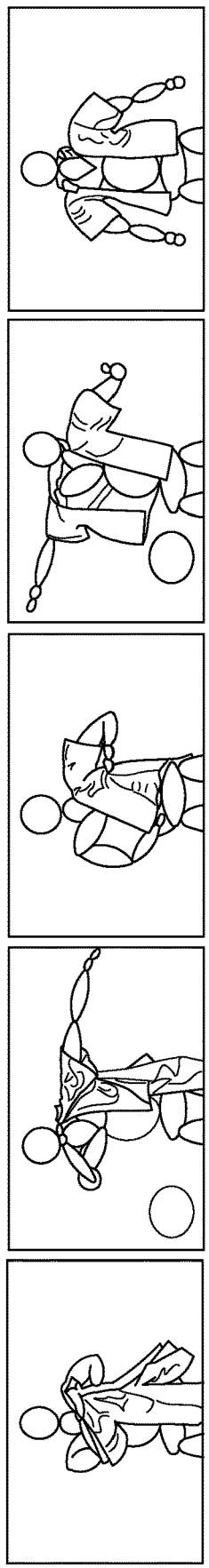
FIG. 4 illustrates an example range of motion image or video user interface component in accordance with at least one example of this disclosure.

FIG. 4 illustrates an example 400 range of motion image or video user interface component in accordance with at least one example of this disclosure. The range of motion example 400 may be shown all at once or as a series of images. The range of motion example 400 may include augmented information (e.g., an indication of pain corresponding to a heart-rate spike). The heart-rate spike may be detected by a device worn by the user (e.g., a sensor patch, a wrist-worn device), by a video monitoring system (e.g., via a camera of a mobile phone), or the like. In an example, a video monitoring system may detect manifestations of pain, such as grimaces. In an example, audio monitoring may occur through a device or phone that may detect audible manifestations of pain. Video or audio monitoring may be performed by a home assistant device or service (e.g. Amazon Echo or Google Home), which may be integrated with the devices or systems described herein.

In an example, the range of motion example 400 illustrates a video captured of a user. In another example, the range of motion example 400 illustrates an animation of a motion shown for a user to emulate. In yet another example, the range of motion example 400 illustrates a video capture of an activity, performed by a professional (e.g., an actor, a doctor, a physical therapist, etc.).

Figure 5:
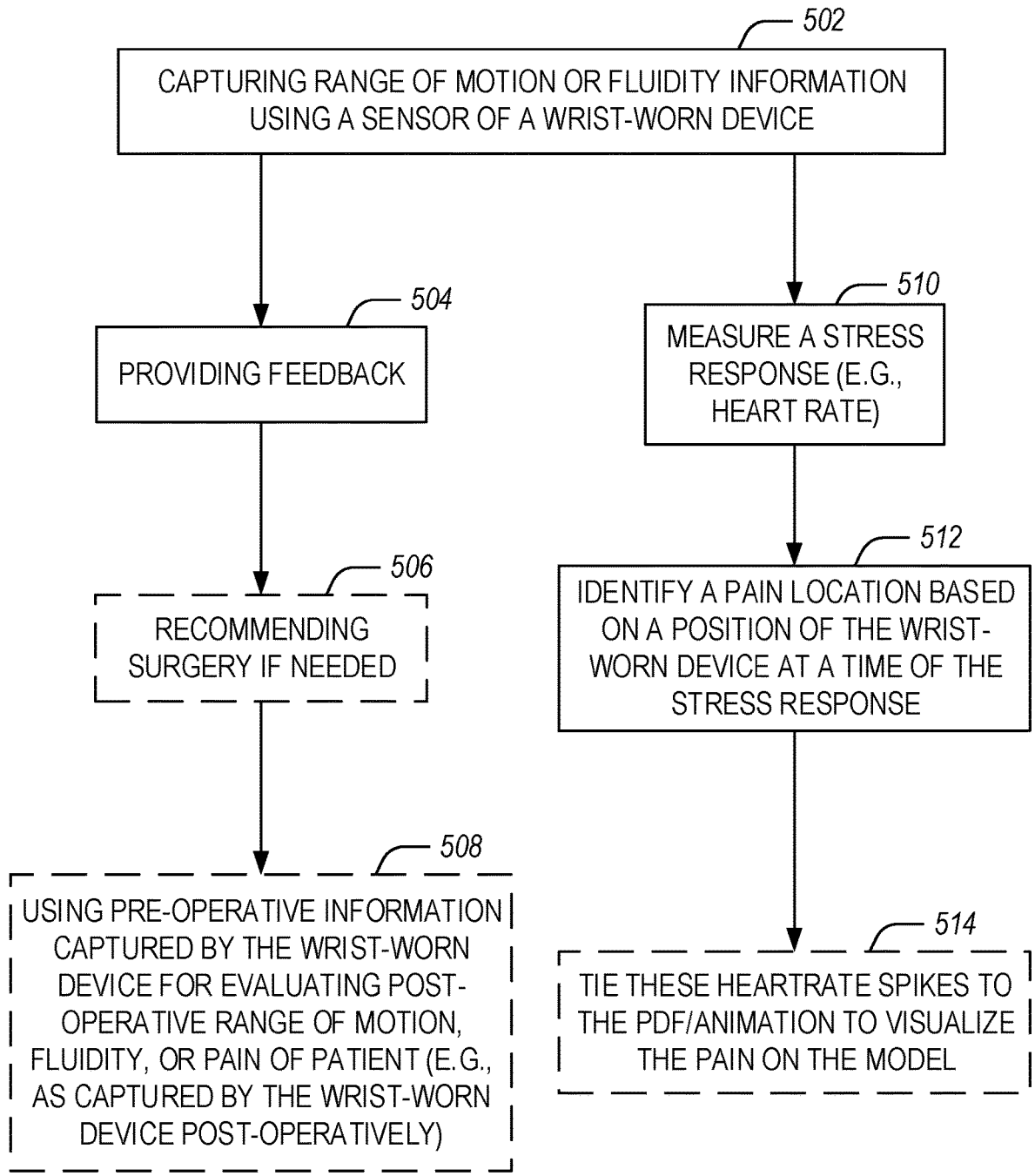
FIG. 5 illustrates a flowchart showing a technique for using a mobile application for upper extremity patient care in accordance with at least one example of this disclosure.

FIG. 5 illustrates a flowchart showing a technique 500 for using a mobile application for upper extremity patient care in accordance with at least one example of this disclosure.

The technique 500 includes an operation 502 to capturing range of motion or fluidity information using a sensor of a wrist-worn device. Operation 502 may include extrapolating elbow pain, fluidity, or range of motion. Operation 502 may include capturing a maximum range of motion from day to day activities. Operation 502 may further include tracking steps taken by the patient, which may include also monitoring or receiving data regarding a maximum movement of the shoulder. Operation 502 may include using automatic identification technology to recognize rotation of the joint. Operation 502 may include detecting potentially harmful movements, for example too active, movement is unclear, deviating from plane while exercising, exceeding recommended ROM, or the like. Operation 502 may include determining that the patient is sleeping on a wrong side, and alerting the patient (e.g., waking the patient up). further comprising determining that a repetitive stress is occurring to the patient, for example like a pitch count.

The technique 500 includes an operation 504 to providing feedback, for example, including at least one of providing a list of activities the patient either can't do or hasn't done; providing activity specific guidance—"we have data collected on tennis activity—[rehab or surgery] will allow you to play tennis better"; providing a high level assessment—"you would be a candidate for X surgery"; providing proactive positive reinforcement that rehab is going well if that is what the data indicates; providing a video message to patient from surgeon that is keyed to customized thresholds for range of motion: e.g., range of motion looks good or range of motion needs work, using haptic feedback on wrist-worn device or audio output by a speaker of the wrist worn device to alert patient to the potentially harmful movements, or the like.

Operation 504 may include further comprising recognizing patient activities without requiring the patient to manually log what the activity was (e.g., use the model), for example determine what action was performed by the patient, such as PROMS: e.g., put on a coat, pull a coffee mug from the cupboard, or the like. In an example, after recognizing patient activities, the data from an action is logged, stored, and optionally communicated to a care team when the user is a patient.

The technique 500 includes an optional operation 506 to recommending surgery if needed. The technique 500 includes an optional operation 508 to using pre-operative information captured by the wrist-worn device for evaluating post-operative range of motion, fluidity, or pain of patient (e.g., as captured by the wrist-worn device post-operatively).

The technique 500 includes an operation 510 to measure a stress response (e.g., heart rate). The technique 500 includes an operation 512 to identify a pain location based on a position of the wrist-worn device at a time of the stress response. The technique 500 includes an optional operation 514 to tie these heartrate spikes to the PDF/animation to visualize the pain on the model.

The technique 500 may include an operation to analyze the angle of selfies taken using phone camera to get data regarding shoulder flexibility. The technique 500 may include an operation to provide a picture or animation of the range of motion—export the animation into a small file format illustrating the motion—click on the patient you can see the path of motion (e.g., in wrist-worn device). The technique 500 may include an operation to measure movement during sleep.

The technique 500 may include an operation to build a skeletal model. For example, this operation may include improving the model dynamics by prompting user with questions (e.g., generate a model based on training data); for example by using a gyroscope on the wrist-worn device to compare the current data to a range of expectations; or obtaining a range of expectations from an opposite arm (e.g., baseline assessments on good shoulder); or developing a baseline from data coming from healthy population; or using data collected from user input, wrist-worn device sensors, or the like to improve implant products and techniques.

Figure 6:
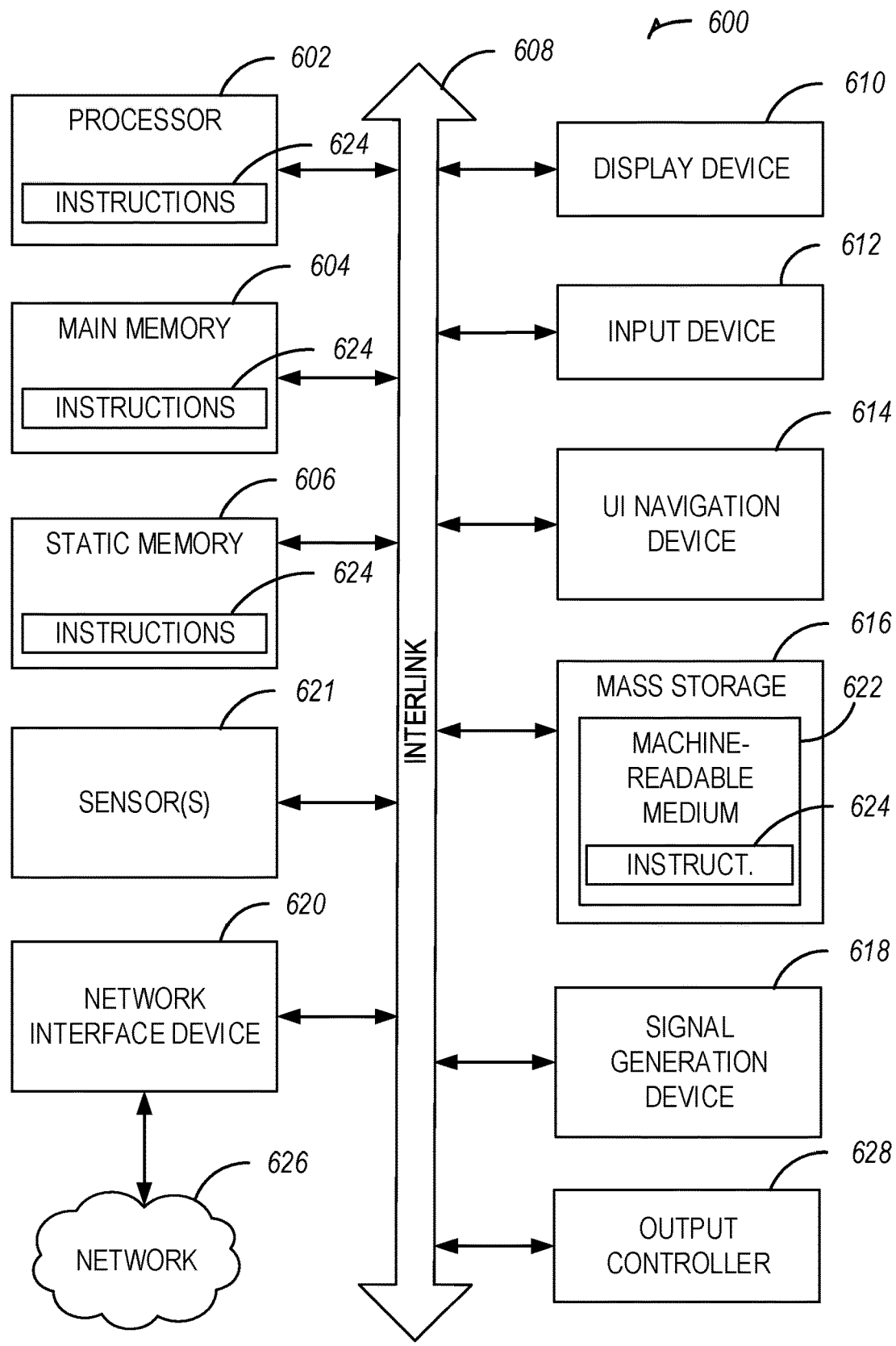
FIG. 6 illustrates a block diagram of an example machine upon which any one or more of the techniques discussed herein may perform in accordance with at least one example of this disclosure.

FIG. 6 illustrates a block diagram of an example machine 600 upon which any one or more of the techniques discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624. The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Example systems and methods are described below for creating a skeletal model of a user. The skeletal model may be generated, in an example, without use of a depth camera or depth sensors or a gait lab. The systems and methods may be used to detect movements or a rep count from a video using deep learning techniques by creating a skeletal model using markers. For example, when doing physical therapy or a musculoskeletal movement analysis there may not be an easy or automated way to analyze the movements around joints to check range of motion or rep count. In some examples, it is infeasible to have a user use a depth camera or a gait lab, which may require too much time for each individual.

The systems and methods described below may be used to train a skeletal model. The skeletal model is useful for tracking movement of a user, tracking reps (e.g., for a physical therapy activity or training regimen), tracking time a position is held, monitoring for correct performance of an exercise or movement, or the like. The automatic tracking may allow a user to focus on the movement or technique performed without worrying about needing to keep a count, time, or movement in their head. The tracked movement, reps, or time may be used for a physical therapy session, such as for rehab or strength training. In an example, the tracked information is used for rehab after an orthopedic surgery, for example to monitor user progress, provide feedback to the user or a clinician, or the like.

A trained skeletal model may be used to process images of a user captured by a camera. The camera may be a camera of a mobile device (e.g., a cell phone), in an example. The camera does not need to be a depth camera or include any additional sensors beyond those of a digital camera.

Figure 7:
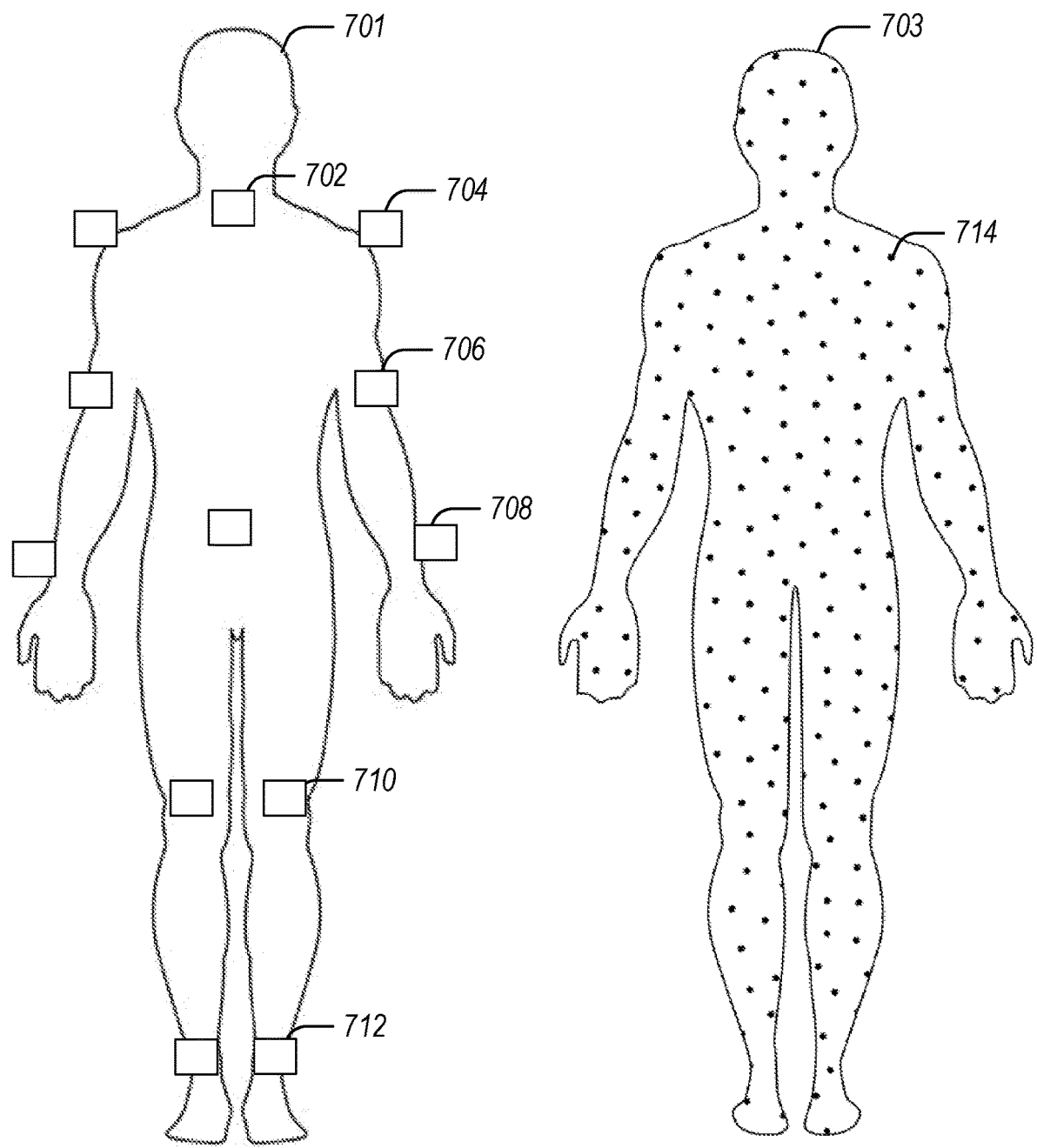
FIG. 7. Illustrates a diagram showing markers on a person for training a machine learning model in accordance with at least one example of this disclosure.

FIG. 7. Illustrates a diagram showing markers (e.g., 702-712 or 714) on a person (e.g., 701 or 703) for training a machine learning model in accordance with at least one example of this disclosure. In an example, the markers (e.g., 702-712) may be color coded (e.g., each marker or pair of markers, such as left-right pairs, may have different colors). In another example, the markers on the person 701 may be black or have arbitrary colors.

The markers on the person 701 may include items affixed to a person. The markers on the person 701 may be arranged in particular locations on the person 701, such as at joints (e.g., shoulder 704, neck 702, elbow 706, wrist 708, or the like).

The markers on the person 703 may include a fabric or suit with a pattern printed or designed on it. The marker 714 is an example of an item printed or designed on an item worn by the person 703. The markers on the person 703 may be arranged randomly or arbitrarily, or may be evenly spaced or arranged, but do not necessarily have a particular arrangement. In an example, the more markers, the more accurate for training or for repeated use accuracy. The markers on the person 703 may cover the person's entire body (e.g., in the example shown in FIG. 7) or may only cover a portion of the body. For example, a leg sheath with markers may be worn by the person 703, giving coverage of only the leg wearing the leg sheath. Where clinical interest is in certain movements, (e.g., gait or movement of a leg), only covering a portion of the person 703 corresponding to that interest may be sufficient for capturing the movements. In an example, a leg sheath may be attached via Velcro, a zipper, or affixed onto the person's leg.

The markers may be worn by a patient or a model user, such as for evaluation or training purposes respectively. Training may be conducted with a user making various movements using the markers, after which a trained model may be generated. The trained model may be used without markers, in an example.

In an example, a training set for joint movements is created by using color coded markers at various joints (e.g., markers 702-712 on person 701). The image color markers may be placed on the person 701 to track the movements with a camera (e.g., a camera of a mobile device, such as a mobile phone). The color markers may be used as landmarks for training a model as the person 701 moves. A video may be captured, which may then be analyzed to determine how the markers are moved for reach prescribed movement. A skeletal model may be generated from the determined movement of the person 701 via the markers (e.g., 702-712). In another example, a skeletal model may be generated via the markers (e.g., 714) on the person 703 using similar techniques.

The training may be conducted with a plurality of people wearing the markers (e.g., 10-15 people) to generate an accurate model. The plurality of people may have diverging body movement, types, sizes, or positioning. The skeletal model that is trained using this technique may be applicable to a broad range of people when used for inferencing due to the different people used in training.

In an example, the skeletal model may be updated recursively using later data as testing data (or the later data may be labeled for use as training data, in an example). In another example, a plurality of skeletal models may be generated, such as one for a particular type of patient (e.g., based on body size, ailment type, such as ankle, knee, shoulder, etc., or the like, or deformity, such as varus or valgus malalignment of the knee).

The skeletal models described herein may be generated based on joints and change in joint angles. In an example, a skeletal model may be scaled to match a patient. In an example, the side of the person 701 may be determined based on using top left corner as origin (0,0), then for example, using a technique such as left to right and top to bottom, with the first marker identified as the right side of the person 701.

In an example, the markers may be used to later evaluate a patient (e.g., not in a training technique). The markers may allow for increased accuracy compared to not using markers. The skeletal model generated in a training phase may also be used in conjunction with a patient later wearing markers for increased accuracy. For example, a skeletal model may be trained using the markers (e.g., 702-712) on person 701, and person 703 may later be a patient wearing markers (e.g., 714) on their entire body or a portion of their body. Movement of the person 703 may be tracked using the markers or the trained skeletal model. Results of the movement tracking may include marker identification or modeled movement based on the skeletal model and captured video. The marker identification and modeled movement may be combined to increase accuracy.

The person 703 may be tracked while moving, for example by capturing video of the person 703. The video may be analyzed to determine a style of walking, in an example. The style may be categorized, for example based on the person's body size, habitus, gait or weight management, demographics, familial influences, or the like. The style may include factors, such as heel strike, walking pace, where the person 703 holds their weight, sway, gait type, gait style, foot separation, stride length, or the like. The person 703 may be a patient, and their style may be captured before a surgical procedure, after, and optionally continue over time. The style before the surgical procedure may inform the surgical procedure, and style after the surgical procedure may be compared to the pre-style, along with pain or discomfort information for example, to determine patient satisfaction and how it relates to the walking style. In an example, the walking style may be used post-operatively to validate the patient's experience (e.g., informing the patient that the style has changed, which may contribute to a feeling of discomfort, but which may improve patient satisfaction by providing the patient understanding why this change has occurred).

Figure 8:
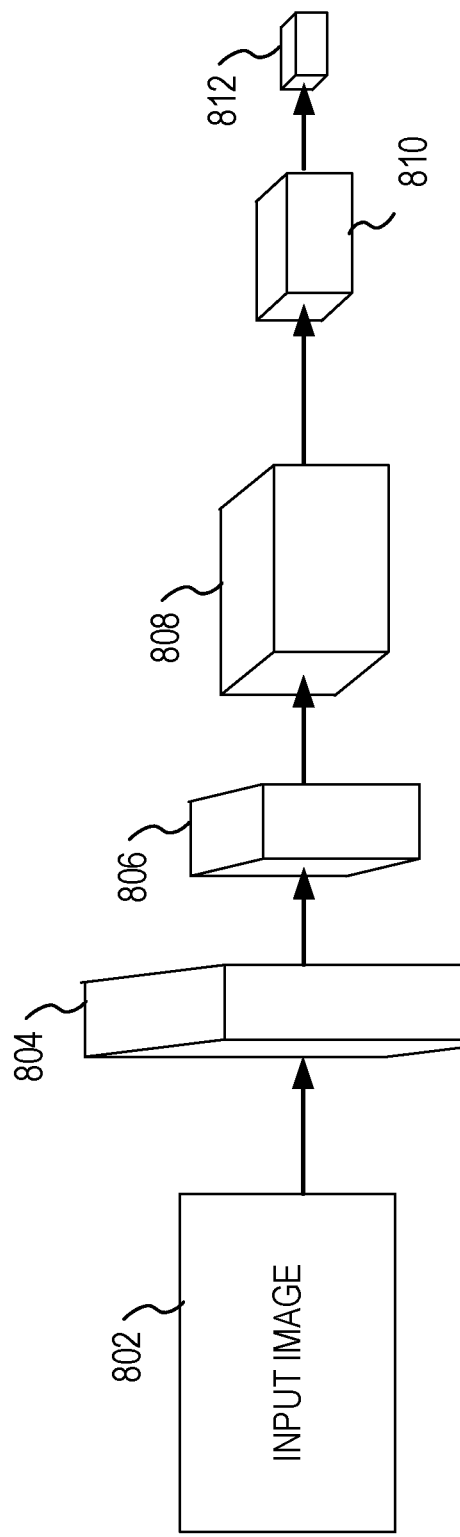
FIG. 8 illustrates an example convolutional neural network in accordance with at least one example of this disclosure.

FIG. 8 illustrates an example convolutional neural network (CNN) 800 in accordance with at least one example of this disclosure. The CNN 800 uses an image, for example captured by a camera, to identify a body outline and markers affixed to the body of a user. The locations of the markers relative to the body outline are determined using the CNN 800. The CNN 800 may include a plurality of hidden layers used to make the identifications. In an example, other deep learning or machine learning techniques may be used to perform the identifications.

The input image 802, which may be output from a camera is fed into the layers of the CNN 800. Each convolutional layer (e.g., layers 804, 806, 808, 810, and 812 may include one or more convolution and pooling layers. In an example, layer 810 may be a separate max pooling layer. Example neural network dimensions are shown for each stage, however, one of ordinary skill with the benefit of the present disclosure will appreciate that other dimensions may be utilized.

The CNN 800 may be trained using the person 701 of FIG. 7, by tracking captured images or video including identifying locations of markers affixed to the person 701. The CNN 800 may identify the markers at various joints on the person for obtaining a skeletal model. Once the location of the markers is identified, the CNN 800 may be used to determine a side of the body the markers are placed on, such as by using a distance function. Then the CNN 800 may use the color of the markers to determine where each marker fits in the skeletal model. Once the skeletal model is created using the CNN 800, a model for different exercises may be created, which may be used with the skeletal model. The CNN 800 may be used after training to analyze movements and output inferences related to the movements, such as a rep count based on an exercise, for example. The skeletal model may be used to identify the exercises based on an exercise library, for example, which may be created using test subjects. In an example, when the model does not identify the exercise or does not correctly identify the exercise, reinforcement learning may be used to identify the correct exercise for the CNN 800.

The components of the CNN 800 may include receiving an input image (e.g., captured by a mobile device) 802, and using the input image 802 to identify features at different layers. For example, layer 804 may identify a body outline, layer 806 may identify markers on the body, and layer 808 may identify locations of the markers with respect to the body. The max pooling layer 810 may be used to downsample the results from layer 808. Then layer 812 may output coordinates, locations, or dimensions of markers identified on a body of a person in the input image 802.

Figure 9:
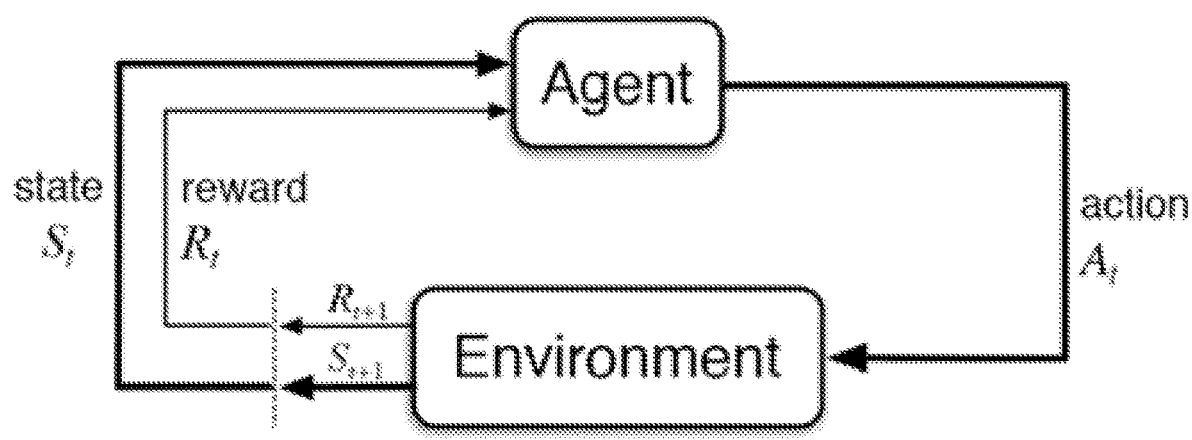
FIG. 9 illustrates an example of reinforcement learning for a neural network in accordance with at least one example of this disclosure.

FIG. 9 illustrates an example of reinforcement learning for a neural network in accordance with at least one example of this disclosure. A system 900 of FIG. 9 may be used to perform the reinforcement learning. For example, a state and reward are sent from an environment to an agent, which outputs an action. The action is received by the environment, and iteratively the reinforcement learning is performed by updating state and reward values and sending those to the agent.

The reinforcement learning system 900 may be used for post processing, for example on already recorded video or images or on real-time video or images, such as to measure an exercise as part of physical therapy or another activity. The skeletal model may be generated for example using the CNN 800 of FIG. 8, based on the markers of FIG. 7. The skeletal model may then be used with images or video captured on a camera, such as a camera of a mobile device (e.g., a phone), without needing or using markers during capture of the exercise. For example, the markers be used for training the skeletal model but do not need to be used for generating inferences using the skeletal model. In an example, markers may be used for inferences, such as to improve accuracy. In an example, a portion of a patient's body may have markers while performing the exercise (e.g., a leg sheath).

In an example, a patient's movements may be captured, an exercise identified, and a portion of user anatomy tracked, (optionally in real-time) via a camera of a mobile device (e.g., a phone) without markers on the patient (or with markers to improve accuracy) using the skeletal model that was trained using markers.

Further image or video processing may be used (e.g., via the skeletal model) to identify information related to an exercise or movement performed by a patient. For example, a walking style may be identified for the patient. In another example, pain based on facial expressions may be identified during the exercise or movement. The pain may be correlated to a particular movement or moment during the exercise to automatically determine what caused the pain. Other techniques (e.g., via a smart watch or other wearable device) as described herein may be used to track movement or pain in addition to or instead of these techniques.

FIG. 10 illustrates various example user interfaces (e.g., 1002-1008) for use with a user needing or wearing a sling in accordance with at least one example of this disclosure. The user interfaces of FIG. 10 may be displayed on a wrist-worn device, such as a smart-watch. The wrist-worn device may include a sensor, such as an accelerometer, to detect movement of an arm of a person wearing the wrist-worn device.

An example user may include a patient who has had a surgical procedure on their arm, shoulder, chest, etc., or a patient who injured their arm, shoulder, chest, etc. For example, the patient may wear a sling for stability or to prevent injury. Slings are effective, when properly used, at stabilizing patient anatomy, but compliance is often difficult, both for the patient to achieve, and for a clinician to measure or detect. In an example, a patient may have an orthopedic shoulder procedure and be instructed to wear a sling for a period of time (e.g., a few weeks).

The user interfaces shown in FIG. 10 illustrate various actions that may be detected using a sensor. User interface 1002 illustrates motion detection of the wrist-worn device suggestive of shoulder movement. In the example of user interface 1002, a patient may be instructed to keep their shoulder from moving, and the user interface 1002 may be used to provide feedback to the patient that movement has occurred and a reminder to keep movement to a minimum. This information may be educational or serve as a reminder to the patient. The user interface 1004 illustrates an example where range of motion of the shoulder of the patient has exceeded a threshold. In this example, the user interface 1004 warns the patient of the unhelpful movement. A patient may be asked to complete assessments of specific movements assigned at set intervals through their clinician's protocol. A video may instruct the patient how to complete the assessment. Metrics of the patient's performance may be measured during the assessment. For example, metrics may include speed (e.g., slow down or speed up movement to demonstrate muscular control and improve accuracy of measurement), plane (e.g., correction of movement or hand positioning to decrease impingement with specific movements and improve accuracy of measurement), smoothness (e.g., provide a metric indicating smoothness through the arc of motion), or compensation (e.g., detection of elbow flexion or scapular compensation with movements). Other metrics may include, when the patient has a sling, post-operative sling management, frequency of reaching above a certain height, max ROM during day, arm swing velocity while walking, heart rate during motion (e.g., for pain response), sleep duration or quality, or the like.

Example user interfaces 1006 and 1008 illustrate a movement exercise interface and a progress update interface, respectively. The movement exercise shown in user interface 1006 facilitates a range of motion test for a patient. The patient may select to start, snooze, or dismiss the range of motion test. The patient may perform the range of motion test and be provided feedback using a wrist-worn device displaying the user interface 1006, which may include a sensor for detecting the movement. The range of motion may be measured at various locations of the patient's arm, such as flexion or extension, horizontal adduction, abduction, caption, internal rotation and external rotation, arm at side, arm at 90-degree abduction, extension or internal rotation, or the like.

The progress update interface as shown in user interface 1008 illustrates a daily living task (e.g., putting on a t-shirt) that the patient has performed (e.g., determined at the suggestion of a user interface, or upon information supplied by the patient, or based on sensor data indicating a particular movement corresponding to putting on a t-shirt). The progress update interface may include a question about pain, which may be used by a clinician to monitor patient pain over time or with particular tasks. An example task may include reaching above a specified height, such as for washing hair, putting on a t-shirt, brushing hair reaching above head to a shelf, etc. Another example task may include detecting extension and internal rotation, such as putting a jacket on, tucking in a shirt, putting a bra on, etc.

In an example, a patient may be tracked before, during, and after a surgical procedure. For example, an initial state may be captured for the patient, optionally before a disease state occurs. The patient state may be captured during a disease state before the surgical procedure. For example, the patient's walking style may be captured when healthy or diseased pre-operatively. Then after the surgical procedure, the patient state may be captured (e.g., the walking style). The post-operative state may be compared to the pre-operative state (diseased or healthy or both), and results may indicate a change or maintenance of a walking style. In another example, the patient may be shown, pre-operatively, a video simulating how a walking style or other patient state will be post-operatively. The transformation may be shown to the patient to encourage the patient to undertake the surgical procedure to improve their state. In yet another example, the patient may be shown, post-operatively, a healthy state or improved state to encourage the patient to put in effort on exercises or physical therapy to improve their state to the healthy or improved state. The simulations may be shown based on a skeletal model and historical data of patients similar to the current patient (e.g., having similar or matching disease states, comorbidities, demographics, etc.).

Figure 11:
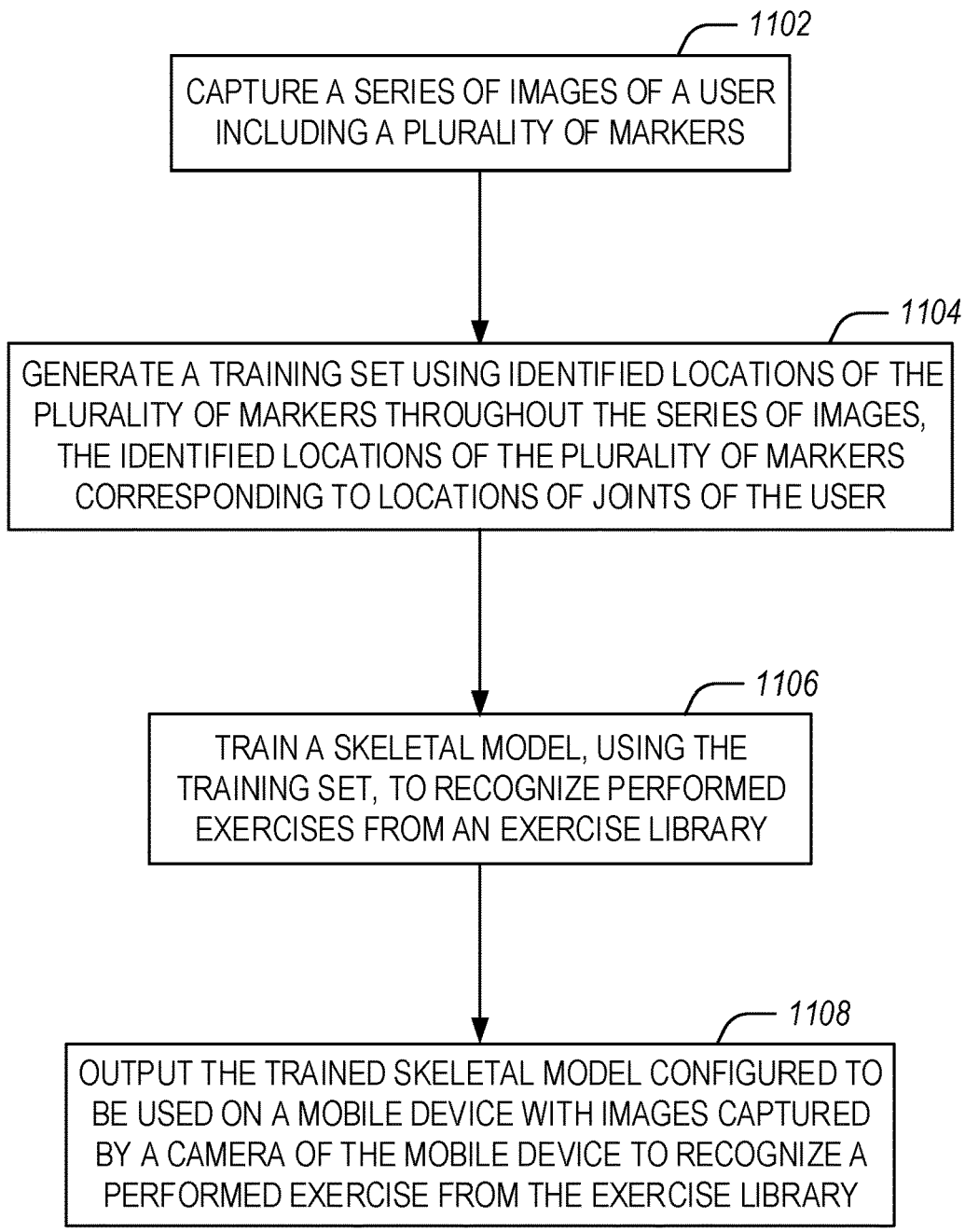
FIG. 11 illustrates a flowchart showing a technique for generating a skeletal model in accordance with at least one example of this disclosure.

FIG. 11 illustrates a flowchart showing a technique 1100 for generating a skeletal model in accordance with at least one example of this disclosure.

The technique 1100 includes an operation 1102 to capture a series of images of a user including a plurality of markers.

The technique 1100 includes an operation 1104 to generate a training set using identified locations of the plurality of markers throughout the series of images, the identified locations of the plurality of markers corresponding to locations of joints of the user.

The technique 1100 includes an operation 1106 to train a skeletal model, using the training set, to recognize performed exercises from an exercise library.

The technique 1100 includes an operation 1108 to output the trained skeletal model configured to be used on a mobile device with images captured by a camera of the mobile device to recognize a performed exercise from the exercise library. The images captured by the camera of the mobile device may be 2D images (e.g., the camera is not a depth camera). The recognition of the performed exercised (e.g., performed by a user) may be performed automatically (e.g., without a need for additional processing of the captured images).

Figure 12:
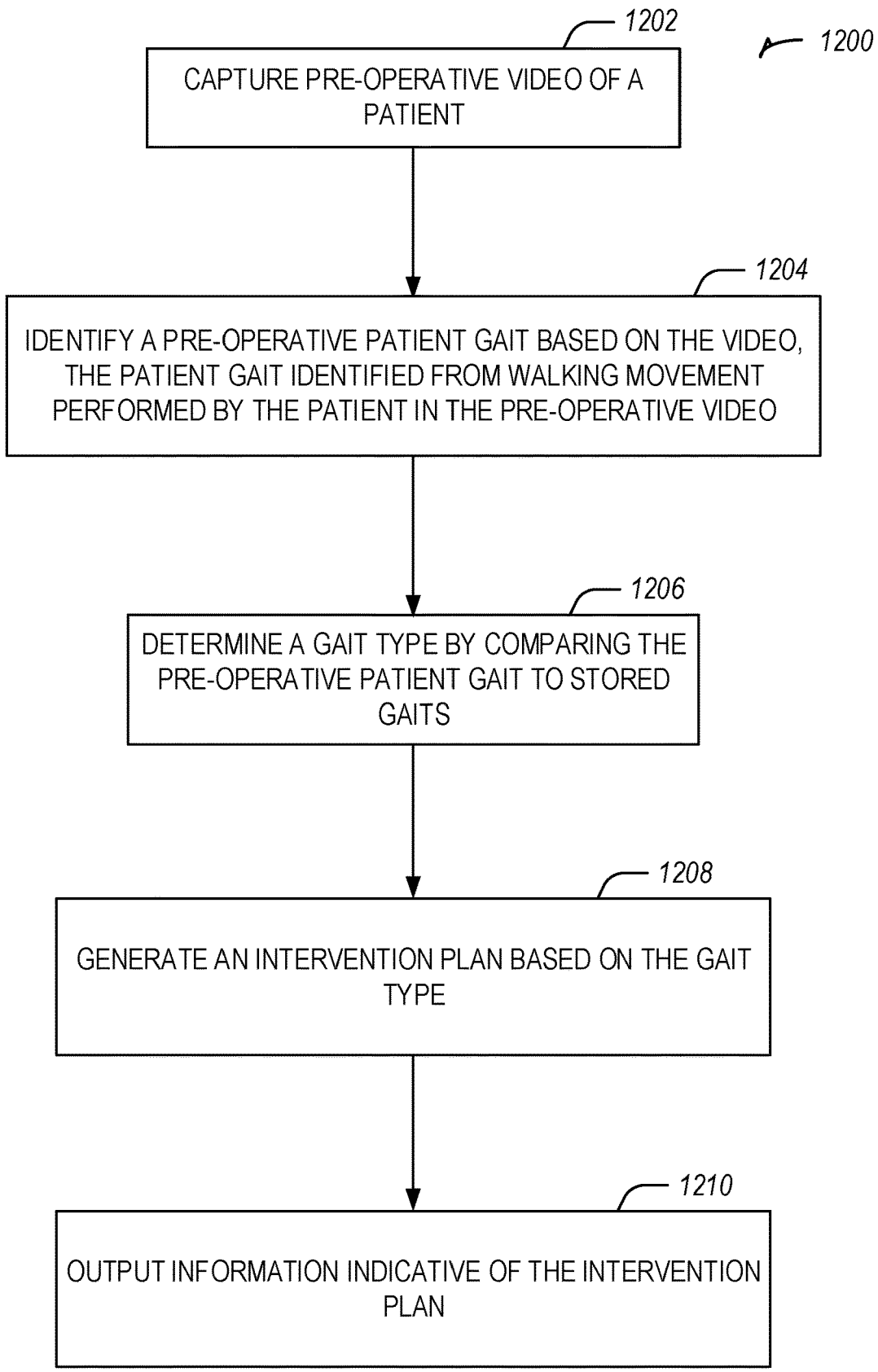
FIG. 12 illustrates a flowchart showing a technique for determining a gait type of a patient in accordance with at least one example of this disclosure.

FIG. 12 illustrates a flowchart showing a technique 1200 for determining a gait type of a patient in accordance with at least one example of this disclosure. A gait type may be a classification, for example based on training data (e.g., labeled by a gait expert, surgeon, or the like). The classification may be generated by a machine learning model, generated using a comparison, etc.

The gait type may be used in various surgical or post-operative techniques. For example, a surgical procedure for a total or partial knee replacement may consider a kinematic alignment of the knee, rather than a mechanical alignment. In a mechanical alignment, a knee is aligned to have a minimal or zero varus/valgus angle, and aligned to support the body mechanically. However, this type of idealized solution may not be as comfortable to the patient, causing dissatisfaction with the procedure. A kinematic alignment, on the other hand, allows a surgeon to align the knee according to how the patient moves, including optionally leaving the knee a few degrees (e.g., 1-4) varus, or a few degrees valgus. The kinematic alignment often leaves patients with a more natural feeling knee, improving outcomes by reducing discomfort. The kinematic alignment may improve ligament function post-operatively as well.

One technique for determining kinematic alignment information for use in a surgical procedure includes determining the pre-operative gait of the patient. The pre-operative gait may be used to determine an alignment target for surgery, or may be used post-operatively for physical therapy to help the patient return to the pre-operative gait. In an example, the pre-operative gait may be assessed in a healthy knee to return a patient to a pre-ailment state.

The gait determined for the patient may be specific to the patient, and one or more gait types may be identified for the patient's gait, such as by a classifier. A set of gait types may be generated using labeled training data, and a machine learning model may be trained on the labeled set of gait types. The patient's gait may be run through the machine learning model to output a gait type classification. The gait type may then be applied to surgical or post-operative uses.

The gait type may be used to determine instant loading on the knee at various stages of gait (or rising from a seated position). The loading on the knee may be used with kinematic alignment to identify pre-operative wear to the native knee. Aspects of a surgical procedure including an implanted knee may be determined from the kinematic alignment, pre-operative wear, or loading, such as a bearing surface, bone to prosthesis interface, or soft tissue restraints.

The gait type may be determined based on pre-operative gait analysis, such as using foot plate heel toe-strike analysis or catwalk or treadmill pressure mapping, which may be compared to dynamic image derived information. In performing a gait analysis, two factors may be used, including a force of where the foot hits the ground, and a sway of how a patient walks (e.g., sway left or right, or more rigidly straight ahead). The distance covered by swaying, the speed of sway, the force on heel or toe, the transfer of weight time from heel to toe, range of motion, speed of walking, stiffness of walking, or other gait factors may be used as weights for a classifier to identify a gait type.

A classifier (e.g., a machine learning model) may be trained to determine how gait characteristics correlate with knee loading patterns. After training, a patient's gait may be input to the classifier to output a knee loading pattern (e.g., a kinematic alignment), according to an example. A recommendation for each of the gait types may be output (e.g., an implant plan, angles, etc.). The gait types may be stored in a database including patient gait profiles (e.g., by demographics).

In an example, once a gait type is determined, the patient may be given information based on the gait type. For example, how others with this gait type have faired with various techniques (e.g., mechanical vs. kinematic alignment), what pain or discomfort may be expected with this gait type, a recovery time frame for this gait type, or the like.

Similar to the knee techniques described in the examples above, hip replacement, ankle procedures, foot procedures, or other lower extremity surgeries may use the gait type to improve patient outcomes. For example, a gait type may be used to determine an optimal functional orientation for the femoral or acetabular components during a hip replacement. In an example, individual variation in pelvic obliquity on standing lying and rising from a seated to standing position may be determined from the gait type. The gait type may be used for custom targeting of component positioning.

The technique 1200 includes an operation 1202 to capture pre-operative video of a patient. The technique 1200 includes an operation 1204 to identify a pre-operative patient gait based on the video, the patient gait identified from walking movement performed by the patient in the pre-operative video.

The technique 1200 includes an operation 1206 to determine a gait type by comparing the pre-operative patient gait to stored gaits. In an example, the gait type includes a walking speed. In an example, the gait type is determined by comparing a force of a foot hitting the ground and a sway of hips of the patient from the pre-operative patient gait to corresponding information of the stored gaits. In an example, the gait type includes a walking stiffness. In an example, the gait type includes a pain value. In an example, the stored gaits are stored in a database of patient gait profiles.

In an example, the gait type is determined using a machine learning model. In an example, the machine learning model is trained using recognizable gait patterns from a plurality of patients having a plurality of co-morbidities and a plurality of gait types. In an example, the machine learning model is trained to correlate gait characteristics with knee loading patterns In an example, the machine learning model is configured to develop a recommended intervention plan for each of a plurality of gait types.

The technique 1200 includes an operation 1208 to generate an intervention plan based on the gait type. In an example, the intervention plan includes a kinematic alignment of a knee of the patient, the kinematic alignment including 1-4 degrees of varus. In an example, the intervention plan includes a range of motion of the patient. In an example, the intervention plan includes a relative patient score based on the gait type. In an example, the intervention plan includes a surgical procedure. The technique 1200 includes an operation 1210 to output information indicative of the intervention plan.

Figure 13:
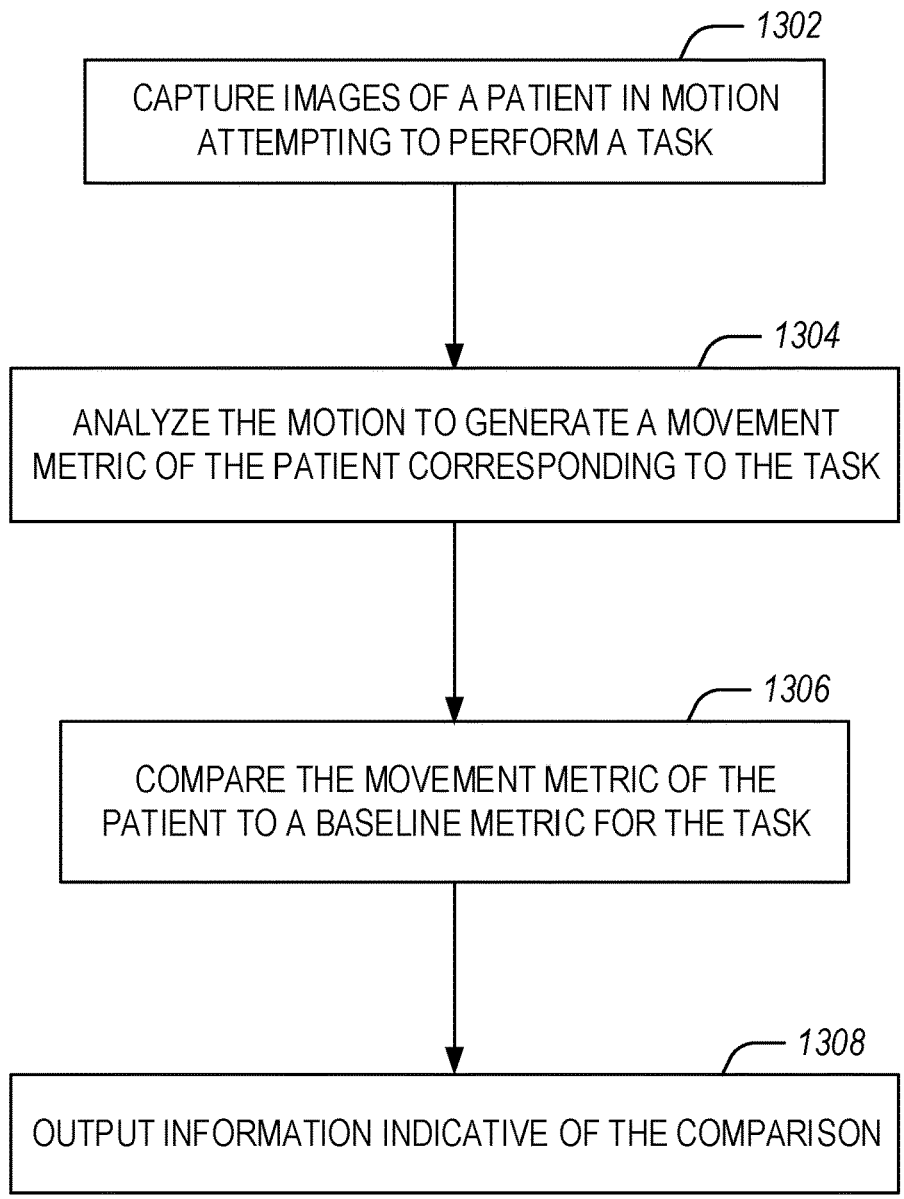
FIG. 13 illustrates a flowchart showing a technique for analyzing movement of an orthopedic patient in accordance with at least one example of this disclosure.

FIG. 13 illustrates a flowchart showing a technique for analyzing movement of an orthopedic patient in accordance with at least one example of this disclosure.

The technique 1300 includes an operation 1302 to capture images (e.g., using a camera of a user device) of a patient in motion attempting to perform a task. In an example, the images captured after completion of an orthopedic surgery on the patient, such as a knee surgery, a hip surgery, etc.

The technique 1300 includes an operation 1304 to analyze (e.g., using a processor) the motion to generate a movement metric of the patient corresponding to the task. A movement metric may include a range of motion, a pain level, a gait type, a task completion amount, a degree varus or valgus, a limp amount, or the like. Operation 1304 may include using data captured by a neck-worn device related to the motion. Operation 1304 may include determining a gait characteristic. A gait model may be used to determine the gait characteristic. The gait model may be generated from a skeletal model of the patient, for example based on pre-operative images of the patient wearing a plurality of colored markers captured by a camera. In another example, the gait model may be generated from pre-operative images of the patient wearing a suit having a pattern of markers. The suit may be a whole body suit or may cover only a part of the patient's body.

The technique 1300 includes an operation 1306 to compare the movement metric of the patient to a baseline metric for the task. The baseline metric may be based on or represent an average performance of the tasks among a population (e.g., of patients with similar comorbidities, age, gender, size, weight, etc.) or the baseline metric may be based on or represent a pre-operative attempt by the patient attempting to perform the task. A task may include walking, moving a body part, performing an occupational therapy movement (e.g., everyday activity or movement, such as placing a cup on a shelf, putting on clothes, etc.), performing a physical therapy movement, or the like.

The technique 1300 includes an operation 1308 to output information indicative of the comparison. The information indicative of the comparison may include quantitative information or qualitative information. The quantitative information may include a score (e.g., a range of motion score or a pain score). The qualitative information may include feedback, such as positive reinforcement (e.g., 'good job'), instructions (e.g., 'try walking for 5 minutes each hour'), or adherence information related to the task, for example based on a milestone (e.g., completing a specified range of motion without pain). The qualitative information may be provided (e.g., via a speaker or a display, such as a display of a wearable device communicatively coupled to a user device) to the patient or a member of a care team for the patient (e.g., a family member, a therapist, a surgeon, or the like).

The technique 1300 may include determining whether performing the task caused the patient pain based on facial expressions of the patient in the captured images while the task was performed. The technique 1300 may include determining whether performing the task caused the patient pain based on a detected increase in heart rate of the patient, captured by a wearable device communicative coupled to the user device, while the task was performed.

Each of the following non-limiting examples may stand on its own, or may be combined in various permutations or combinations with one or more of the other examples.

Example 1 is a method comprising: capturing range of motion or fluidity information using a sensor of a wrist-worn device; measure a stress response (e.g., heart rate) as proxy for pain during arm motions; identify a pain location based on a position of the wrist-worn device at a time of the stress response; tie these heartrate spikes to the PDF/animation to visualize the pain on the model.

Example 2 is a method comprising: analyze the angle of selfies taken using phone camera to get data regarding shoulder flexibility; output information to a wrist-worn device.

Example 3 is a method comprising: capturing range of motion or fluidity information using a sensor of a wrist-worn device; optionally performing one or more actions described below from examples 14-18; recommending surgery if needed; using pre-operative information captured by the wrist-worn device for evaluating post-operative range of motion, fluidity, or pain of patient (e.g., as captured by the wrist-worn device post-operatively).

In Example 4, the subject matter of Examples 1-3 includes, analyzing the angle of selfies taken using phone camera to get data regarding shoulder flexibility.

In Example 5, the subject matter of Examples 1-4 includes, extrapolating elbow pain, fluidity, or range of motion.

In Example 6, the subject matter of Examples 1-5 includes, providing a picture or animation of the range of motion—export the animation into a small file format illustrating the motion—click on the patient you can see the path of motion (e.g., in wrist-worn device).

In Example 7, the subject matter of Examples 1-6 includes, building a skeletal model.

In Example 8, the subject matter of Example 7 includes, improving the model dynamics by prompting user with questions (e.g., generate a model based on training data); for example by using a gyroscope on the wrist-worn device to compare the current data to a range of expectations; or obtaining a range of expectations from an opposite arm (e.g., baseline assessments on good shoulder); or developing a baseline from data coming from healthy population; or using data collected from user input, wrist-worn device sensors, or the like to improve implant products and techniques.

In Example 9, the subject matter of Example 8 includes, recognizing patient activities without requiring the patient to manually log what the activity was (e.g., use the model), for example determine what action was performed by the patient, such as PROMS: e.g., put on a coat, pull a coffee mug from the cupboard, or the like.

In Example 10, the subject matter of Examples 1-9 includes, measuring movement during sleep.

In Example 11, the subject matter of Examples 1-10 includes, capturing a maximum range of motion from day to day activities.

In Example 12, the subject matter of Example 11 includes, tracking steps taken by the patient, which may include also monitoring or receiving data regarding a maximum movement of the shoulder.

In Example 13, the subject matter of Examples 1-12 includes, using automatic identification technology to recognize rotation of the joint.

In Example 14, the subject matter of Examples 1-13 includes, detecting potentially harmful movements, for example too active, movement is unclean, deviating from plane while exercising, exceeding recommended ROM, or the like.

In Example 15, the subject matter of Example 14 includes, using haptic feedback on wrist-worn device or audio output by a speaker of the wrist worn device to alert patient to the potentially harmful movements.

In Example 16, the subject matter of Examples 14-15 includes, determining that the patient is sleeping on a wrong side, and alerting the patient (e.g., waking the patient up).

In Example 17, the subject matter of Examples 14-16 includes, determining that a repetitive stress is occurring to the patient, for example like a pitch count.

In Example 18, the subject matter of Examples 1-17 includes, providing feedback, including at least one of providing a list of activities the patient either can't do or hasn't done; providing activity specific guidance—"we have data collected on tennis activity—[rehab or surgery] will allow you to play tennis better"; providing a high level assessment—"you would be a candidate for X surgery"; providing proactive positive reinforcement that rehab is going well if that is what the data indicates; providing a video message to patient from surgeon that is keyed to customized thresholds for range of motion: e.g., range of motion looks good or range of motion needs work, or the like.

Example 19 is a method comprising: capturing images, using a camera of a user device, of a patient in motion attempting to perform a task, the images captured after completion of an orthopedic surgery on the patient; analyzing, using a processor, the motion to generate a movement metric of the patient corresponding to the task; comparing, using the processor, the movement metric of the patient to a baseline metric for the task; and presenting, on a display, an indication of the comparison including a qualitative result of the comparison.

In Example 20, the subject matter of Example 19 includes, wherein the display is a display of a wearable device communicatively coupled to the user device.

In Example 21, the subject matter of Examples 19-20 includes, wherein analyzing the motion includes using data captured by a neck-worn device related to the motion.

In Example 22, the subject matter of Examples 19-21 includes, wherein the baseline metric represents an average performance of the task among a population.

In Example 23, the subject matter of Examples 19-22 includes, wherein the baseline metric represents a pre-operative attempt by the patient attempting to perform the task.

In Example 24, the subject matter of Examples 19-23 includes, wherein the task includes walking, and wherein analyzing the motion includes determining a gait characteristic.

In Example 25, the subject matter of Example 24 includes, wherein analyzing the motion includes using a gait model generated from a skeletal model of the patient based on pre-operative images of the patient wearing a plurality of colored markers captured by the camera.

In Example 26, the subject matter of Examples 24-25 includes, wherein analyzing the motion includes using a gait model generated from pre-operative images of the patient wearing a suit having a pattern of markers.

In Example 27, the subject matter of Examples 19-26 includes, determining whether performing the task caused the patient pain based on facial expressions of the patient in the captured images while the task was performed, and wherein presenting the indication further includes presenting information related to the pain.

In Example 28, the subject matter of Examples 19-27 includes, determining whether performing the task caused the patient pain based on a detected increase in heart rate of the patient, captured by a wearable device communicative coupled to the user device, while the task was performed, and wherein presenting the indication further includes presenting information related to the pain.

In Example 29, the subject matter of Examples 19-28 includes, wherein the qualitative result includes adherence information related to the task and wherein the qualitative result is based on a milestone.

In Example 30, the subject matter of Examples 19-29 includes, wherein the qualitative result is sent to a member of a care team for the patient.

Example 31 is a method comprising: capturing range of motion information using a sensor of a wrist-worn device of a patient attempting to perform a task, the range of motion information captured after completion of an orthopedic surgery on the patient; determining a stress response, based on a heart rate measured by the sensor, as a proxy for pain during arm motion of a patient; identifying a pain location based on a position of the wrist-worn device at a moment of the stress response; presenting, on a display of the wrist-worn device, an indication related to the pain location including a qualitative result.

In Example 32, the subject matter of Examples 19-31 includes, analyzing, using a processor, the pain location at the moment to generate a movement metric; and comparing, using the processor, the movement metric of the patient to a baseline metric for the task; and wherein the qualitative result corresponds to the comparison.

In Example 33, the subject matter of Examples 31-32 includes, wherein presenting the indication related to the pain location includes providing a picture or animation of the range of motion, the picture or animation indicating the pain location.

In Example 34, the subject matter of Examples 31-33 includes, automatically identifying the task without patient input and initiating the range of motion capture in response to automatically identifying the task without patient input.

In Example 35, the subject matter of Examples 31-34 includes, wherein the qualitative result indicates that the range of motion includes a potentially harmful movement.

In Example 36, the subject matter of Example 35 includes, alerting the patient to the potentially harmful movement using haptic feedback on the wrist-worn device or audio output by a speaker of the wrist worn device.

In Example 37, the subject matter of Examples 31-36 includes, determining that the patient is sleeping on a wrong side, and alerting the patient using the wrist-worn device.

Example 38 is a method comprising: capturing pre-operative video of a patient; identifying a pre-operative gait of the patient based on walking movement performed by the patient in the pre-operative video; determining a gait type by comparing the pre-operative gait to a plurality of stored gaits; generating an orthopedic intervention plan for the patient based on the gait type; and outputting information indicative of the intervention plan for display.

Example 39 is at least one machine-readable medium including instructions that, when executed by processing circuitry, cause the processing circuitry to perform operations to implement of any of Examples 1-38.

Example 40 is an apparatus comprising means to implement of any of Examples 1-38.

Example 41 is a system to implement of any of Examples 1-38.

Example 42 is a method to implement of any of Examples 1-38.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
capturing pre-operative video of a patient;
identifying, using processing circuitry, a pre-operative gait of the patient based on walking movement performed by the patient in the pre-operative video;
determining a gait type using a machine learning model, the machine learning model trained using gait patterns from a plurality of patients having a plurality of co-morbidities and a plurality of gait types;
generating, using the processing circuitry, an orthopedic intervention plan for the patient based on the gait type; and
outputting information indicative of the orthopedic intervention plan for display, wherein outputting the information indicative of the orthopedic intervention plan for display includes outputting a set of instant loading data on a knee of the patient at corresponding stages of the identified pre-operative gait.

2. The method of claim 1, wherein the gait type includes a walking speed.

3. The method of claim 1, wherein the gait type includes a walking stiffness.

4. The method of claim 1, wherein the gait type includes a pain value.

5. The method of claim 1, wherein the orthopedic intervention plan includes a kinematic alignment of a knee of the patient, the kinematic alignment including between 1-4, inclusive, degrees of varus.

6. The method of claim 1, wherein the orthopedic intervention plan includes a surgical procedure.

7. The method of claim 1, wherein the gait type includes a classification generated by a classifier, the classification including a knee loading pattern.

8. The method of claim 1, wherein the pre-operative gait is based on a healthy knee of the patient and wherein the orthopedic intervention plan includes one or more interventions to return the patient to the pre-operative gait.

9. The method of claim 1, wherein the gait patterns from the plurality of patients are labeled with surgical outcomes.

10. The method of claim 1, wherein outputting the set of instant loading data on the knee includes outputting an identification of pre-operative wear to the knee using a kinematic alignment.

11. At least one non-transitory machine-readable medium including instructions, which when executed by processing circuitry, cause the processing circuitry to perform operations to:
- capture pre-operative video of a patient;
- identify a pre-operative gait of the patient based on walking movement performed by the patient in the pre-operative video;
- determine a gait type using a machine learning model, the machine learning model trained using gait patterns from a plurality of patients having a plurality of co-morbidities and a plurality of gait types;
- generate an orthopedic intervention plan for the patient based on the gait type; and
- output information indicative of the orthopedic intervention plan for display, wherein to output the information indicative of the orthopedic intervention plan for display includes to output a set of instant loading data on a knee of the patient at corresponding stages of the identified pre-operative gait.

12. The at least one non-transitory machine-readable medium of claim 11, wherein the gait type includes a walking speed.

13. The at least one non-transitory machine-readable medium of claim 11, wherein the gait type includes a walking stiffness.

14. The at least one non-transitory machine-readable medium of claim 11, wherein the gait type includes a pain value.

15. The at least one non-transitory machine-readable medium of claim 11, wherein the orthopedic intervention plan includes a kinematic alignment of a knee of the patient, the kinematic alignment including between 1-4, inclusive, degrees of varus.

16. The at least one non-transitory machine-readable medium of claim 11, wherein the orthopedic intervention plan includes a surgical procedure.

17. The at least one non-transitory machine-readable medium of claim 11, wherein the gait type includes a classification generated by a classifier.

18. The at least one non-transitory machine-readable medium of claim 11, wherein the pre-operative gait is based on a healthy knee of the patient and wherein the orthopedic intervention plan includes one or more interventions to return the patient to the pre-operative gait.

* * * * *